Figure 1:
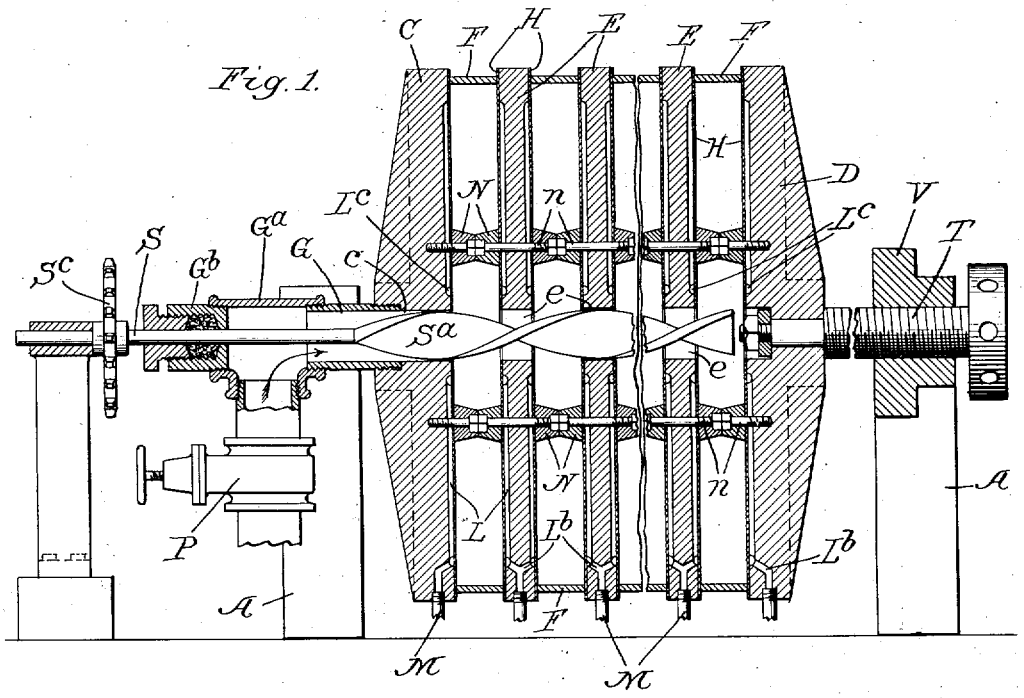

No. 11,772. Reissued Sept. 19, 1899.

J. H. HINKEN.

FILTER PRESS.

(Application filed July 13, 1899.)

Witnesses.
Edward T. Wray.
Jean Elliott.

Inventor.
John H. Hinken
by Burton and Burton
his Att'ys.

UNITED STATES PATENT OFFICE.

JOHN H. HINKEN, OF LOUISVILLE, KENTUCKY, ASSIGNOR TO THE J. E. TURNEY DRYING MACHINERY COMPANY, OF CHICAGO, ILLINOIS.

FILTER-PRESS.

SPECIFICATION forming part of Reissued Letters Patent No. 11,772, dated September 19, 1899.

Original No. 607,929, dated July 26, 1898. Application for reissue filed July 13, 1899. Serial No. 723,747.

*To all whom it may concern:*

Be it known that I, JOHN H. HINKEN, a citizen of the United States, residing at Louisville, county of Jefferson, and State of Kentucky, have invented certain new and useful Improvements in Filter-Presses, which are fully set forth in the following specification, reference being had to the accompanying drawings, forming a part thereof.

The purpose of this invention is to overcome certain difficulties and defects found in the use of filter-presses of the general type which involves the formation of cells for the liquid to be filtered between filter-plates—that is, plates having drainage-channels on their faces and covered with filtering fabric over the channels and adapted to be charged with the material to be filtered under pressure, the water or other liquid being forced out through the filtering-cloth and escaping through the drainage-channels, the solid matter being left behind in the cells until the same are full, when it is removed in the form of cake, the press being then reassembled and recharged. In using a press of this type for filtering such materials as brewers' grains and distillers' slops and the like it is found that for some unknown reason the different solids contained in the material to be filtered are very frequently separated and deposited in different cells. Thus, for example, one cell may be occupied almost wholly by bran, while the next cell will be occupied almost wholly by gluten, while the third cell will again be occupied almost wholly by bran. The gluten being much more dense when thus accumulated than the bran, the filter-plate, which is exposed between the bran upon one side and gluten on the other side, is liable to be bent toward the bran by the greater pressure exerted through the more dense gluten, and when the plates are made of cast-iron they are very rapidly broken up, and when made of wood they are bent and rapidly ruined for the purpose. To remedy this defect is one purpose of my invention.

In using a press of this type for such material it is also found that the throat or entrance-mouth at the center of the head or first filter-plate or some subsequent plate is liable to become choked notwithstanding the continuous pressure, and after the first cell or possibly the first two cells are filled it becomes impossible to force any more liquid into the press by reason of the choking of the passage. To remedy this defect is a second purpose of my present invention.

It is also found in the use of such presses that the fabric which overlies the channeled filter-plates, being exposed to the pressure of the liquid with which the press is charged for filtering the same and being sunken somewhat into the channels by the pressure, if the fabric is placed on the plates with either warp or woof threads parallel with the channels, will develop openings between the adjacent threads at the margin of the channels. This arises from the fact that a warp-thread, for example, lying along the edge of the channel when the pressure is exerted upon the fabric spanning the channel will be engaged by the edge of the channel and the next adjacent thread just over the edge will be crowded away from it by the pressure, the thread which extends transverse to the channel being slightly stretched and permitting the sagging of the fabric into the channel, the action being precisely as if a comb had been inserted through the fabric between the threads extending in one direction and the threads between which it was thus inserted were parted forcibly by the comb. Such opening permits the material to pass through without filtering and very soon fill the channels with the solid matter which ought to have been filtered out by the fabric and retained in the cells. To overcome this defect is the third purpose of my present invention.

Figure 2:
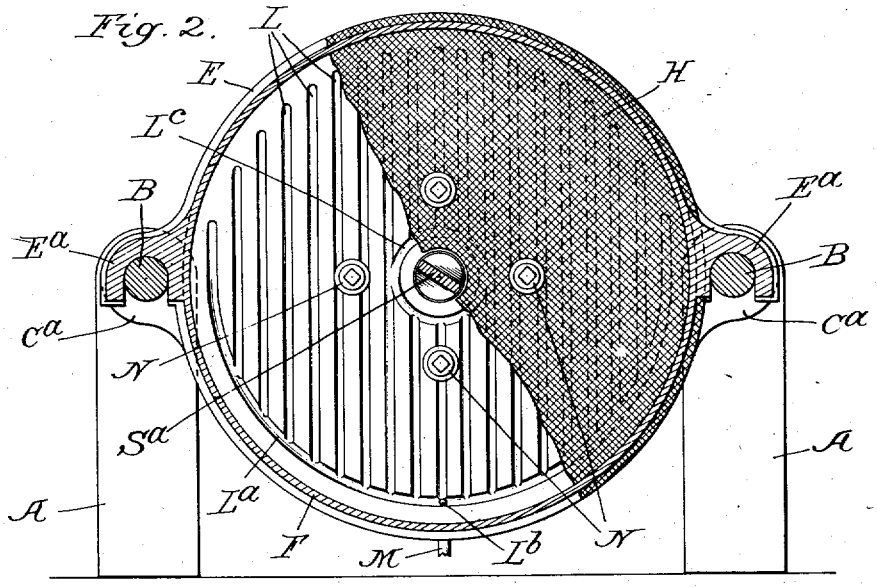

In the drawings, Figure 1 is an axial section of my improved filter-press. Fig. 2 is a transverse section showing in face elevation one of the filter-plates and the filtering fabric on the same partly torn away to show the channel-face of the plate.

The general construction of the press being familiar may be referred to very briefly. It comprises suitable post-like supports A A, &c., arranged at the corners of a parallelogram, the bearing-rods B B, parallel to each other and extending from post to post upon each side, the fixed end filtering-plate C, hung and stopped by its lugs $C^3$ $C^3$ on the bearing-rods B B, the opposite end filtering-plate or follower D, hung but not stopped on the bearing-rods, and the intermediate filter-plates E E E, &c., to any desired number, hung on the bearing-rods between the two heads and separated from each other and from the heads by the rings F F F, &c., which constitute the peripheral cell-walls and which are hung by suitable lugs $E^a$ $E^a$ upon the bearing-rods and bound tightly between the filtering-plates and heads in series when the plates are assembled. The intermediate filtering-plates E E and the fixed head or filter-plate C have the induction-apertures *c* and *e e e*, respectively. Into the induction-aperture *c* of the fixed head or filter-plate C the inlet-pipe G is connected. The filtering-faces of the filtering-plates, including the heads, have vertical channels L L L, &c. These channels are connected at their lower ends by the channel $L^a$, extending parallel to the lower half of the circumference of the plate inside the seat of the cell-walls F, and from these connecting-channels $L^a$ drainage-ports $L^b$ lead to discharge-pipes M for the water or other liquid which is pressed out through the filtering-cloth. To prevent direct communication between the vertical drainage-channels and the induction-apertures, these channels, which extend toward the induction-apertures, stop short of the margin of the apertures and are connected at a little distance back therefrom by a circular channel $L^c$.

To overcome the first defect above mentioned and accomplish the first above-stated purpose of my invention, I provide abutments N N N, which are bolted onto the face of the filtering-plates after the fabric cover H is applied, these abutments from the facing surfaces of consecutive plates being adapted to meet midway in the depth or longitudinal extent of the cells, so that any excess of pressure in any cell instead of tending to bulge the filtering-plate toward the adjacent cell, where there is less pressure, is transmitted through the abutments to the heads C and D, which have sufficient rigidity to resist the entire pressure. By securing these abutments in the manner illustrated, by applying them on top the filtering fabric and securing opposite abutments on intermediate filter-plates by one and the same bolt extending also through the intervening plate and sinking the heads and nuts of the bolts *n* in the heads of the abutments, I prevent any possiblity of leakage occurring through the fabric by reason of the hole made therein in securing the abutments and also insure the abutments being retained and not pulled off by the adhesion of the material with which the cell is packed in and by the process of filtering, for I have found that this adhesion is sufficient to tear off an abutment secured less fixedly than as described. By mounting the abutments on top the fabric also I avoid a difficulty which would arise if the abutment were integral with or secured directly to the filter-plate before the cloth is applied. In that case the cloth would have to be stretched over the knobs which the abutments would form, and in addition to this strain upon the fabric it would be exposed to the direct pressure of the knobs upon each other, which would work holes through it very rapidly.

The second defect above noted I overcome in the following manner: In the inlet-pipe G is a T-fitting $G^a$, whose cross is in the line of the induction-apertures of the filter-plates, the supply-pipe being connected to the stem of the T and the valve P being located back of that connection. The end of the cross of the T opposite that which is connected by the pipe G to the filter-plate is provided with a stuffing box $G^b$, through which extends the shaft S of a clearing-blade $S^a$, whose width is substantially the diameter of the induction-apertures in the filter-plates. Outside the stuffing-box $G^b$ a sprocket-wheel $S^c$ is secured to the shaft S and affords means for rotating it slowly. The blade $S^a$ extends through all the induction-apertures in the filter-plates, terminating beyond the last of the intermediate plates—that is to say, in the last cell next the follower or outer end filter-plate D. I find that by keeping such a blade in constant rotation while the material is being fed in under pressure through the induction-apertures of the filter-plates into the cells these apertures are easily kept clear and all the cells can be filled simultaneously and equally. An advantage is obtained by twisting the clearing-blade into spiral form, as shown in the drawings, the direction of twist relatively to the direction of rotation being such that in addition to keeping the apertures clear by its rotation it tends slightly to feed the material onward. A very slight twist is sufficient for this purpose.

The third defect above mentioned I overcome by placing the filtering fabric H on the channeled face of the plates with both the threads of its web oblique to the parallel channels, or, as it may be commonly expressed, by applying it biaswise with respect to the channels. It will be obvious at once that when thus applied the detention of one thread on the edge of the channel while the next thread is forced over the edge and a rift opened between the two threads is rendered impossible, since there is no thread that lies along the edge of the channel, all the threads crossing the channel obliquely. Of course there is a short distance along the edge of the curved channel $L^a$ where a thread lies approximately parallel—that is, tangent to the curve; but besides the fact that this is so near the edge of the cloth there is very little opportunity for the necessary stretch of the transverse threads to permit the separation of the thread which might be thus lodged. The further fact that the lodged thread is in position to be detained along the curved edge only for a very short distance prevents any danger of opening at such points, and ordinarily I find it unnecessary to make provision (which could be made by zigzagging the channel $L^3$ at these points) for preventing the separation of the threads at the tangent points.

It will be understood that the press is closed up and clamped tight by the center screw T, taking through the cross-head V, fixed with respect to the posts and bearing-rods, and that sufficient space is allowed on the bearing-rods for separating the heads and filtering-plates, and thus opening up all the cells to empty the same.

I claim—

1. In a filter-press, in combination with filter-plates having induction-apertures, a clearing-blade penetrating the plates at such apertures, and suitable means for rotating said blade to clear the apertures.

2. In a filter-press, in combination with the filter-plates having induction-apertures in line and the induction-pipe in line with such apertures; a clearing-blade extending through the apertures and out through the induction-pipe, said pipe having an angle and the blade having a stem extending out through the angle provided with a suitable stuffing-box, and means beyond the stuffing-box for rotating the blade.

3. In a filter-press, in combination with filter-plates having induction-apertures, a spiral blade extending through such apertures, and means for rotating the blade.

4. In a filter-press, in combination with the channeled filtering-plates, filtering fabric applied to the channeled faces of the plates with the threads of its web oblique to the channels.

In testimony whereof I have hereunto set my hand, in the presence of two witnesses, at Louisville, Kentucky, this 29th day of June, 1899.

JOHN H. HINKEN.

Witnesses:

OTTO A. ROTHERT,

E. KERSEBRING.